(12) United States Patent
Lim et al.

(10) Patent No.: US 11,729,513 B2
(45) Date of Patent: Aug. 15, 2023

(54) ELECTRONIC DEVICE AND HDR IMAGE GENERATION METHOD THEREFOR

(71) Applicant: Samsung Electronics Co., Ltd., Suwon-si (KR)

(72) Inventors: Sanghyeon Lim, Suwon-si (KR); Junhyeon Kim, Suwon-si (KR); Dongyoung Choi, Suwon-si (KR); Dongo Kim, Suwon-si (KR); Youngmin Kim, Suwon-si (KR); Junki Cho, Suwon-si (KR); Jiyoon Park, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/880,147

(22) Filed: Aug. 3, 2022

(65) Prior Publication Data

US 2022/0377228 A1    Nov. 24, 2022

Related U.S. Application Data

(63) Continuation of application No. PCT/KR2021/001269, filed on Feb. 1, 2021.

(30) Foreign Application Priority Data

Feb. 11, 2020   (KR) ..................... 10-2020-0016539

(51) Int. Cl.
*H04N 23/741*    (2023.01)
*H04N 23/72*     (2023.01)

(52) U.S. Cl.
CPC ........... *H04N 23/741* (2023.01); *H04N 23/72* (2023.01)

(58) Field of Classification Search
CPC ...... H04N 23/741; H04N 23/72; H04N 23/62; H04N 23/631; H04N 25/60; H04N 23/71; H04N 23/81
See application file for complete search history.

(56) References Cited

U.S. PATENT DOCUMENTS

| 6,720,993 B1 * | 4/2004 | Hwang | .................. | H04N 23/70 348/208.13 |
| 2005/0264682 A1 * | 12/2005 | Kurane | ................ | H04N 23/745 348/362 |

(Continued)

FOREIGN PATENT DOCUMENTS

| JP | 2013-058922 A | 3/2013 |
| JP | 2013-162359 A | 8/2013 |

(Continued)

*Primary Examiner* — Mekonnen D Dagnew
(74) *Attorney, Agent, or Firm* — Jefferson IP Law, LLP

(57) ABSTRACT

An electronic device and a high dynamic range (HDR) image generation method therefore are provided. The electronic device includes an image sensor and a processor, wherein the processor can be configured to adjust the exposure of the image sensor so as to acquire a first image having a first brightness and a plurality of second images having a second brightness, perform, on the first image, brightness conversion and noise attenuation of at least a first intensity so as to provide a third image having the second brightness, and generate a second HDR image on the basis of the first image and the third image, and generate a second HDR image on the basis of the first HDR image and the plurality of second images.

15 Claims, 9 Drawing Sheets

(56) References Cited

U.S. PATENT DOCUMENTS

| | | | |
|---|---|---|---|
| 2010/0091119 A1 | 4/2010 | Lee | |
| 2011/0254976 A1* | 10/2011 | Garten | G06F 3/1454 |
| | | | 348/E5.037 |
| 2012/0218442 A1* | 8/2012 | Jandhyala | G06T 5/50 |
| | | | 348/E5.051 |
| 2015/0296116 A1* | 10/2015 | Tsuzuki | H04N 23/6811 |
| | | | 348/208.1 |
| 2016/0150146 A1 | 5/2016 | You et al. | |
| 2016/0352995 A1* | 12/2016 | Min | H04N 23/741 |
| 2017/0026594 A1* | 1/2017 | Shida | H04N 23/741 |
| 2019/0138259 A1* | 5/2019 | Bagaria | G06T 5/009 |
| 2019/0199948 A1 | 6/2019 | Kim et al. | |

FOREIGN PATENT DOCUMENTS

| | | |
|---|---|---|
| KR | 10-2010-0040651 A | 4/2010 |
| KR | 10-2013-0034186 A | 4/2013 |
| KR | 10-2013-0040321 A | 4/2013 |
| KR | 10-2016-0061612 A | 6/2016 |
| KR | 10-2018-0045553 A | 5/2018 |
| KR | 10-2019-0077680 A | 7/2019 |

* cited by examiner

ELECTRONIC DEVICE AND HDR IMAGE GENERATION METHOD THEREFOR

CROSS-REFERENCE TO RELATED APPLICATION(S)

This application is a continuation application, claiming priority under § 365(c), of an International application No. PCT/KR2021/001269, filed on Feb. 1, 2021, which is based on and claims the benefit of a Korean patent application number 10-2020-0016539, filed on Feb. 11, 2020, in the Korean Intellectual Property Office, the disclosure of which is incorporated by reference herein in its entirety.

BACKGROUND

1. Field

The disclosure relates to an electronic device and a high dynamic range (HDR) image provision method therefor.

2. Description of Related Art

Electronic devices (e.g., mobile terminals, smart phones, wearable devices, etc.) can provide various functions. For example, in addition to a basic voice communication function, the smart phone can provide a short-range wireless communication (e.g., Bluetooth, wireless-fidelity (Wi-Fi), or near field communication (NFC), etc.) function, a mobile communication (3rd-generation (3G), 4th-generation (4G), 5th-generation (5G), etc.) function, a music or video playback function, a video recording function, or a navigation function, etc.

Recently, as the performance of device components is improved, the electronic device provides a function of generating a high dynamic range (HDR) image by using images acquired from an image sensor acquiring an image in the electronic device.

The above information is presented as background information only to assist with an understanding of the disclosure. No determination has been made, and no assertion is made, as to whether any of the above might be applicable as prior art with regard to the disclosure.

SUMMARY

In general, the electronic device has a problem in that a ghost effect occurs when a high dynamic image is generated. The ghost effect refers to, for example, an artifact occurrence phenomenon in which an afterimage remains in an image according to a movement of a subject during image synthesis.

Aspects of the disclosure are to address at least the above-mentioned problems and/or disadvantages and to provide at least the advantages described below. Accordingly, an aspect of the disclosure is to provide an electronic device and an HDR image provision method therefor, capable of effectively removing a ghost effect and a noise occurring at the time of high dynamic range (HDR) image provision, by using a plurality of image frames, even in an image having a lot of motions.

Additional aspects will be set forth in part in the description which follows and, in part, will be apparent from the description, or may be learned by practice of the presented embodiments.

In accordance with an aspect of the disclosure, an electronic device of is provided. The electronic device includes, for example, an image sensor and a processor. The processor may be configured to acquire a first image having a first brightness and a plurality of second images having a second brightness, by adjusting the exposure of the image sensor, and provide a third image having the second brightness, by performing, on the first image, brightness conversion and noise reduction of at least a first strength, and provide a first HDR image, based on the first image and the third image, and provide a second HDR image, based on the first HDR image and the plurality of second images.

In accordance with another aspect of the disclosure, a method of an electronic device including an image sensor and a processor is provided. The method includes, for example, acquiring a first image having a first brightness and a plurality of second images having a second brightness by adjusting the exposure of the image sensor, and providing a third image having the second brightness by performing, on the first image, brightness conversion and noise reduction of at least a first strength, and providing a first HDR image, based on the first image and the third image, and providing a second HDR image, based on the first HDR image and the plurality of second images.

In accordance with another aspect of the disclosure, an electronic device is provided. The electronic device includes, for example, an image sensor, an image signal processor and a processor. The processor may be configured to acquire a first image having a first brightness and a plurality of second images having a second brightness by adjusting the exposure of the image sensor, and control the image signal processor to provide a third image having the second brightness by performing, on the first image, brightness conversion and noise reduction of at least a first strength, and provide a first HDR image, based on the first image and the third image, and provide a second HDR image, based on the first HDR image and the plurality of second images.

Various embodiments of the disclosure may effectively remove a ghost effect and a noise occurring at the time of HDR image provision, by using a plurality of image frames.

Various embodiments of the disclosure may effectively remove a ghost effect even in an image having a lot of motions, and improve a quality of capturing a high-quality high dynamic image of a low noise and a good resolution.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
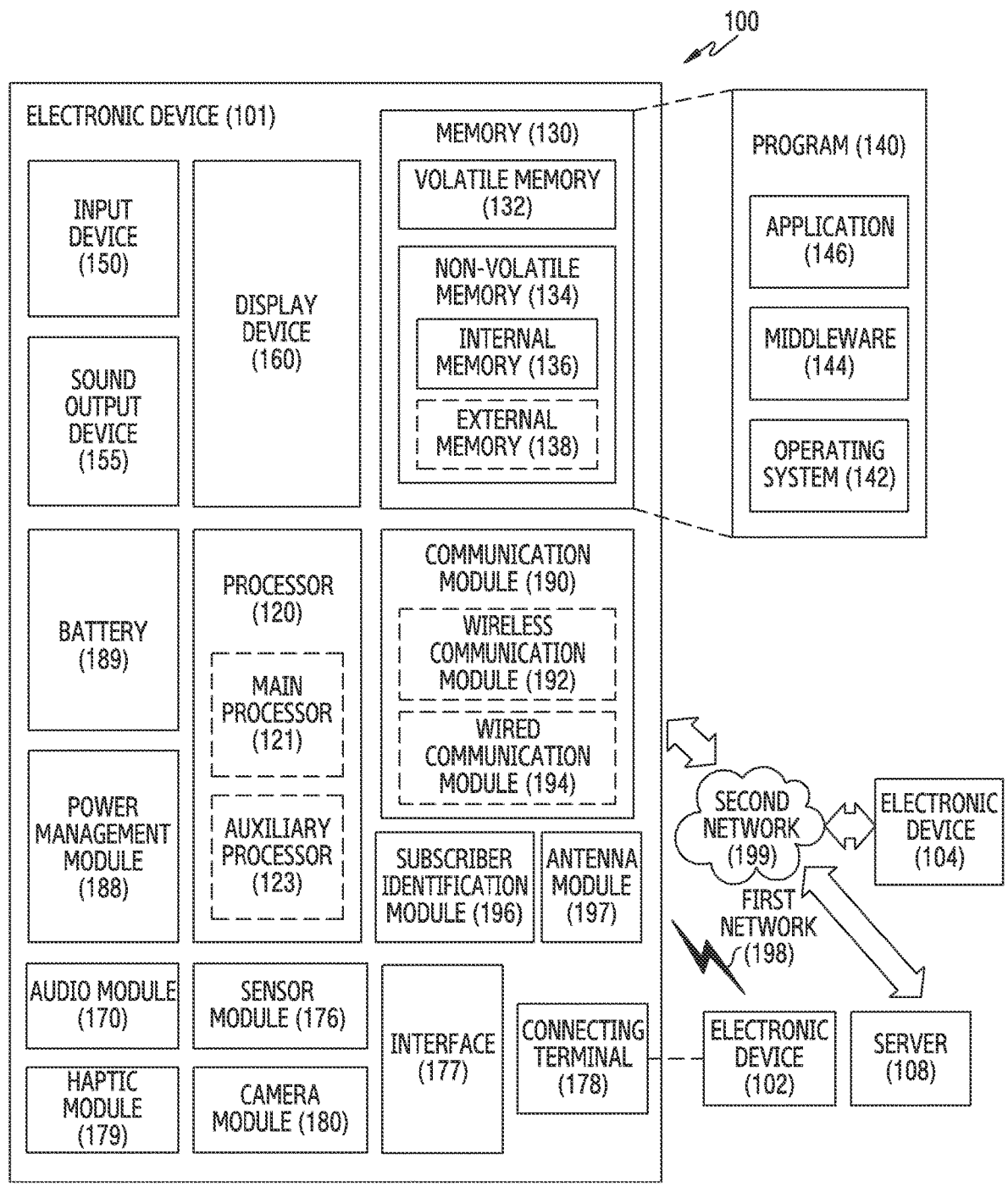
FIG. 1 is a block diagram of an electronic device in a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture an image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
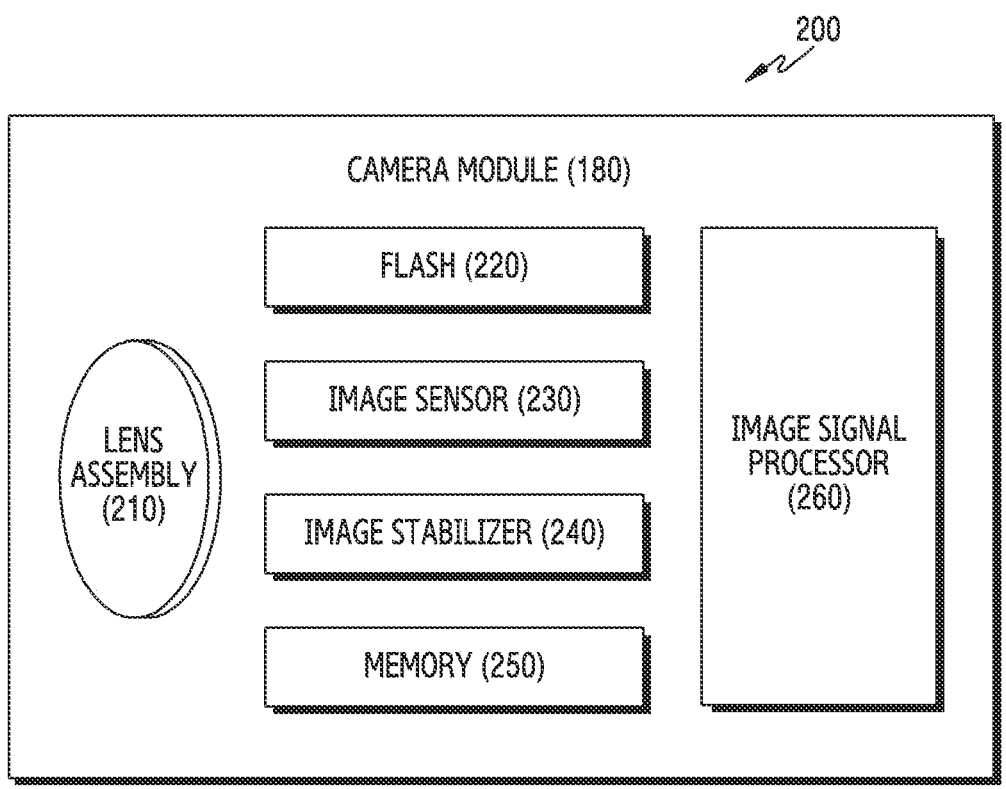
FIG. 2 is a block diagram illustrating a camera module according to an embodiment of the disclosure.

FIG. 2 is a block diagram illustrating a camera module according to an embodiment of the disclosure.

Referring to FIG. 2 depicting block diagram 200, a camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
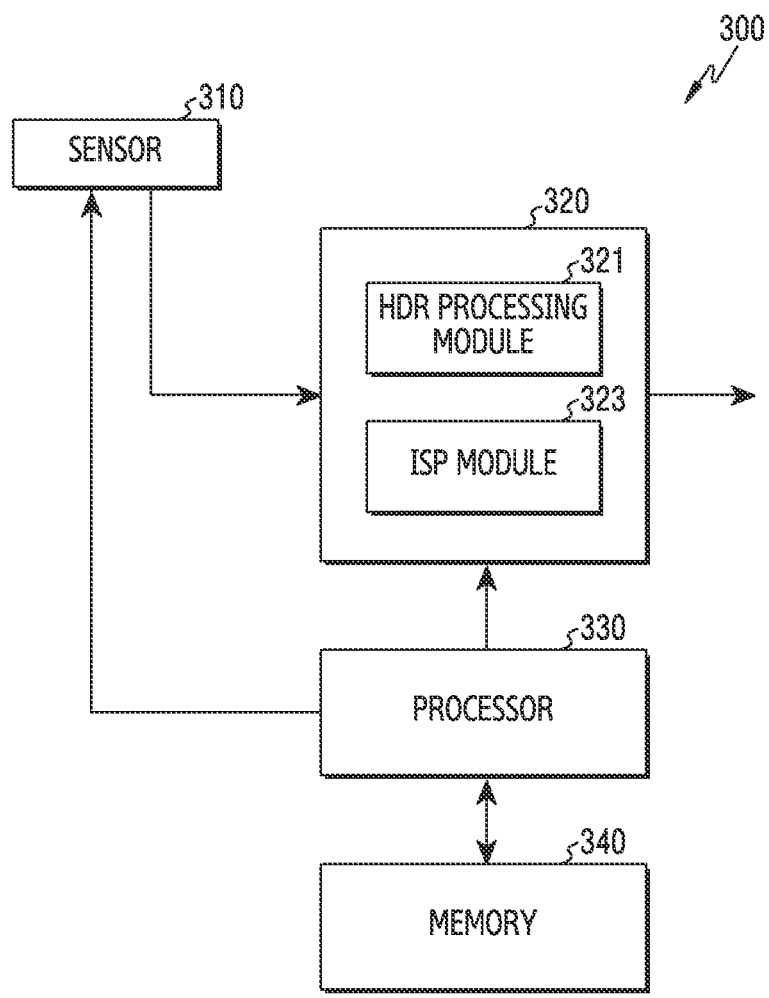
FIG. 3 is a block diagram illustrating an electronic device for providing an HDR image according to an embodiment of the disclosure.

FIG. 3 is a block diagram illustrating an electronic device for providing a high dynamic range (HDR) image according to an embodiment of the disclosure. For example, the electronic device 300 may include the electronic device 101 of FIG. 1.

Referring to FIG. 3, an electronic device 300 of various embodiments may include, for example, an image sensor 310, an image signal processor 320, a processor 330, and a memory 340.

According to various embodiments, the image sensor 310 may include the image sensor 230 of FIG. 2. According to various embodiments, the image sensor 310 may include at least a part of the camera module 180 of FIG. 2.

According to various embodiments, the image sensor 310 may acquire a plurality of image frames so as to provide an HDR image.

According to various embodiments, the image sensor 310 may acquire a plurality of image frames at high speed so as to provide an HDR image.

According to various embodiments, the image sensor 310 may acquire a plurality of image frames at a high speed of, for example, about 30 times per second or more.

According to various embodiments, the image sensor 310 may, for example, adjust exposure and acquire a plurality of image frames having various brightness or luminance.

According to various embodiments, the image sensor 310 may, for example, acquire a plurality of image frames having various brightness, such as a dark (e.g., −EV, −2EV, −3EV, −4EV) image, an appropriate brightness (e.g., 0EV) image, or a bright (e.g., +EV, +2EV, +3EV, +4EV) image.

According to various embodiments, the image sensor 310 may, for example, initially acquire a predetermined number (e.g., 5) of dark image frames and then acquire image frames of an appropriate brightness.

According to various embodiments, in providing an image frame for providing an HDR image, the image sensor 310 may, for example, adjust exposure and acquire one image frame of an appropriate brightness at least as an initial image and thereafter, acquire a predetermined number (e.g., 5) of dark image frames and then acquire image frames of various brightness such as image frames of an appropriate brightness and/or bright image frames.

According to various embodiments, the image signal processor 320 may include the auxiliary processor 123 of FIG. 1 or the image signal processor 260 of FIG. 2.

According to various embodiments, the image signal processor 320 may include a high dynamic range (HDR) processing module 321 and an image signal processing module 323.

According to various embodiments, image frames acquired from the image sensor 310 may be processed by the HDR processing module 321 and then be processed by the image signal processing module 323. For example, the HDR processing module 321 may process the original image before image signal processing (bayer domain), and provide an HDR image. For example, the image signal processing module 323 may perform image signal processing (ISP demosaic execution) on the provided HDR image.

According to various embodiments, unlike this, image frames acquired from the image sensor 310 may be, for example, implemented to be first processed (ISP demosaic execution) by the image signal processing module 323 and then be processed by the HDR processing module 321 as well. For example, the HDR processing module 321 may provide an HDR image by using YUV or RGB data after image signal processing on the original image.

According to various embodiments, the HDR processing module 321 may, for example, perform digital gain and/or noise reduction on image frames inputted from the image sensor 310 or image frames inputted from the image signal processing module 323, and convert a brightness of the image frame, for example, brightly or reduce various noises such as a ghost effect.

According to various embodiments, the HDR processing module 321 may be implemented to directly process the original image data (e.g., bayer domain data) inputted from the image sensor 310 or, otherwise, process later image data (e.g., YUV or RGB data) outputted by processing the original image data by the image signal processing module 323.

DR, that is, dynamic range refers to a ratio between a dark region and a bright region. A dynamic range of the real visible world is wider than a range of an image acquired by an image sensor. The HDR processing module 321 may synthesize and output an image capable of expressing an available entire region of a dynamic range (DR) of the visible world by using a plurality of image frames of different exposures, that is, different brightness.

However, for example, when there is a movement of a subject in a bright portion (bright part) of an image, a ghost effect may occur in a general HDR image synthesized using these images, because parallax occurs between different image frames acquired from the image sensor 310.

According to various embodiments, the HDR processing module 321 may perform different image processing on the same single image frame among inputted image frames and synthesize them, to provide a primary HDR image, thereby removing the ghost effect.

According to various embodiments, the HDR processing module 321 may brighten at a brightness of a reference image by applying a digital gain greater than a general digital gain to a dark image frame among inputted image frames wherein it has a brightness of a reference image or a general brightness image, and provide a reference image frame by performing strong noise reduction and, apart from this, primarily provide an HDR image by synthesizing, with the reference image frame, an image frame obtained by applying the general digital gain to the dark image frame and performing general weak noise reduction. Accordingly to this, since the primarily provided HDR image is provided by synthesizing two image frames in which strong noise reduction and weak noise reduction have been performed on the same dark image frame, a ghost-free primary HDR image may be provided.

According to various embodiments, for example, a saturated region may be provided according to brightness conversion in a reference image frame provided by applying a digital gain to a dark image frame and performing strong noise reduction. For example, by applying a general digital gain to the dark image frame and synthesizing an image frame subjected to general weak noise reduction with the reference image frame, the above-described saturated region may be removed and a detail of a bright portion (bright part) may be enhanced.

According to various embodiments, the HDR processing module 321 may perform brightness conversion by applying a digital gain to, for example, one of initially provided dark image (e.g., −EV or −2EV) frames among the inputted image frames, and provide a bright image (e.g., 0EV, +EV or +2EV).

According to various embodiments, the HDR processing module 321 may perform strong noise reduction of at least a specific strength on a bright image that is brightness-converted from a dark image frame. For example, a noise reduction strength for strong noise reduction may be significantly stronger, for example, 4 times or more, than a noise reduction strength for a general image frame. For example, the noise reduction strength for strong noise reduction may be calculated, for example, by multiplying a sensor digital gain value for general noise reduction performed on a dark image of the image sensor 310 acquiring the dark image additionally by a digital gain value for brightness converting a dark image into an appropriate brightness, and performing a predetermined correction.

Meanwhile, the order of the above-described brightness conversion and strong noise reduction processing is not limited by the above description and, for example, the noise reduction may be first performed on the image and then the brightness conversion may be later performed as well.

According to various embodiments, the HDR processing module 321 may secondarily provide an HDR image, by additionally using an appropriate brightness and/or bright image frame for the firstly provided HDR image. Accordingly, the HDR processing module 321 may provide the secondary HDR image that is an HDR image in which a detail is more enhanced. Accordingly, the HDR processing module 321 may provide the secondary HDR image in which a detail of a dark portion (dark part) of an image frame is enhanced.

According to various embodiments, the image signal processing module 323 may perform image processing (ISP demosaic) (e.g., providing a depth map, 3D modeling, providing a panorama, extracting a feature point, synthesizing an image, or compensating for an image (e.g., noise reduction, resolution adjustment, brightness adjustment, blurring, sharpening, or softening)) on an image frame acquired through the image sensor 310 or an image frame processed by the HDR processing module 321.

According to various embodiments, the processor 330 may control the image sensor 310 to adjust exposure and acquire image frames of various different brightness, as described above.

According to various embodiments, the processor 330 may control the image signal processor 320 to directly process an image frame acquired from the image sensor 310 or, when necessary, may control the image signal processor 320 to temporarily store in the memory 340 and then process as well.

According to various embodiments, the memory 340 may include the memory 130 of FIG. 1 or the memory 250 of FIG. 2.

According to various embodiments, the memory 340 may temporarily store an image frame acquired from the image sensor 310, data provided according to image processing, or a provided HDR image.

According to various embodiments, when a save command for a provided HDR image is inputted, the memory 340 may store the provided HDR image.

Figure 4:
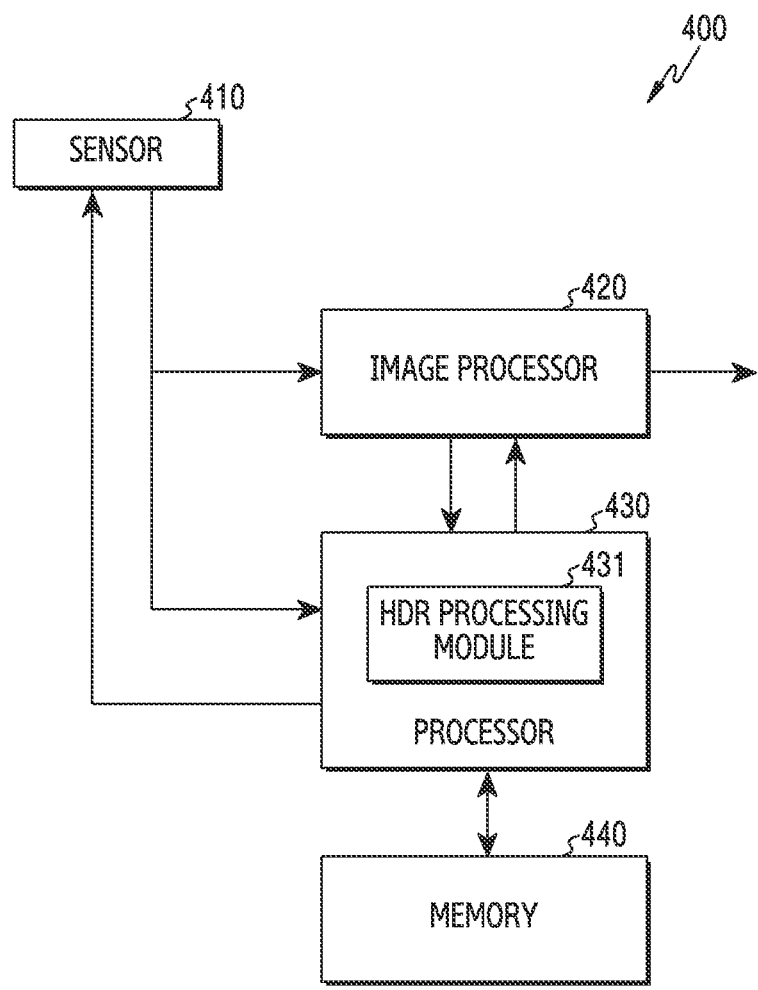
FIG. 4 is a block diagram illustrating an electronic device for providing an HDR image according to an embodiment of the disclosure.

FIG. 4 is a block diagram illustrating an electronic device providing an HDR image according to an embodiment of the disclosure. For example, the electronic device 400 may include the electronic device 101 of FIG. 1 or the electronic device 300 of FIG. 3.

Referring to FIG. 4, an electronic device 400 of various embodiments may include, for example, an image sensor 410, an image signal processor 420, a processor 430, and a memory 440.

According to various embodiments, the image sensor 410 may include the image sensor 230 of FIG. 2 or the image sensor 310 of FIG. 3. According to various embodiments, since an operation and function of the image sensor 410 are similar to those of the image sensor 310 of FIG. 3, a detailed description thereof will be omitted.

According to various embodiments, the processor 430 may include an HDR processing module 431. Since an operation and function of the HDR processing module 431 of FIG. 4 are similar to those of the HDR processing module 321 of FIG. 3, a detailed description thereof will be omitted.

According to various embodiments, an operation and function of the image signal processor 420 are similar to those of the image signal processor 320 of FIG. 2, but a function performed by the HDR processing module 321 may be processed by the processor 430.

According to various embodiments, image frames acquired by the image sensor 410 may be, for example, processed by the processor 430 including the HDR processing module 431 and then be processed by the image signal processor 420. For example, the HDR processing module 431 may provide an HDR image by processing the original image before image signal processing (bayer domain). For example, the image signal processor 420 may then perform image signal processing (ISP demosaic) on the provided HDR image.

According to various embodiments, unlike this, image frames acquired from the image sensor 410 may be implemented to be, for example, first processed by the image signal processor 420 and then be processed by the HDR processing module 421 of the processor 430 as well. For example, the image signal processor 420 may perform image signal processing (ISP demosaic) on the original image, to provide YUV data. For example, the HDR processing module 431 may provide an HDR image by using image data (e.g., the YUV data) inputted from the image signal processor 420.

According to various embodiments, image frames acquired from the image sensor 410 may be, for example, implemented to be first processed by the image signal processor 420 and then be processed by the HDR processing module 421 of the processor 430 and then be again additionally processed by the image signal processor 420 as well. For example, the image signal processor 420 may perform image signal processing (ISP demosaic) on the original image, provide YUV data. For example, the HDR processing module 431 may provide an HDR image by using image data (e.g., the YUV data) inputted from the image signal processor 420. For example, the image signal processor 420 may perform additional post-processing on the HDR image.

An electronic device (e.g., the electronic device 101, 300 or 400 of FIG. 2, FIG. 3 or FIG. 4) of various embodiments may include an image sensor (e.g., the image sensor 230, 310 or 410 of FIG. 2, FIG. 3 or FIG. 4) and a processor (e.g., the processor 120, 330 or 430 of FIG. 2, FIG. 3 or FIG. 4). The processor may be configured to acquire a first image having a first brightness and a plurality of second images having a second brightness, by adjusting the exposure of the image sensor, and provide a third image having the second brightness, by performing, on the first image, brightness conversion and noise reduction of at least a first strength, and provide a first HDR image, based on the first image and the third image, and provide a second HDR image, based on the first HDR image and the plurality of second images.

According to various embodiments, the first brightness may be a brightness lower than a reference brightness, and the second brightness may be a brightness equal to or greater than the reference brightness.

According to various embodiments, the processor may provide the first HDR image, by performing, on the first image, brightness conversion and noise reduction of at least a second strength and then synthesizing the first image with the third image.

According to various embodiments, the first strength may be set based on a value obtained by multiplying the second strength by at least a digital gain value for bright converting the first brightness into the second brightness.

According to various embodiments, the electronic device may further include an HDR processing module (e.g., the HDR processing module 321 or 431 of FIG. 3 or FIG. 4). The HDR processing module may perform an operation for providing the first HDR image and the second HDR image under the control of the processor.

According to various embodiments, the brightness conversion on the first image may be performed by applying a digital gain value for converting the first brightness into the second brightness.

According to various embodiments, the electronic device may further include a touch screen (e.g., the display device 160 of FIG. 1). The processor of various embodiments may display an icon including a dynamic image indicating that image acquisition of the image sensor is being performed, on the touch screen.

According to various embodiments, the processor may be configured to, after first acquiring an initial image of the second brightness by adjusting the exposure of the image sensor, acquire the first image and then acquire the plurality of second images.

According to various embodiments, the processor may be configured to display a preview image for the initial image of the second brightness on the touch screen while at least the icon is displayed.

According to various embodiments, the processor may be configured to, when the second HDR image is provided, display the second HDR image, in place of the preview image, on the touch screen.

Figure 5:
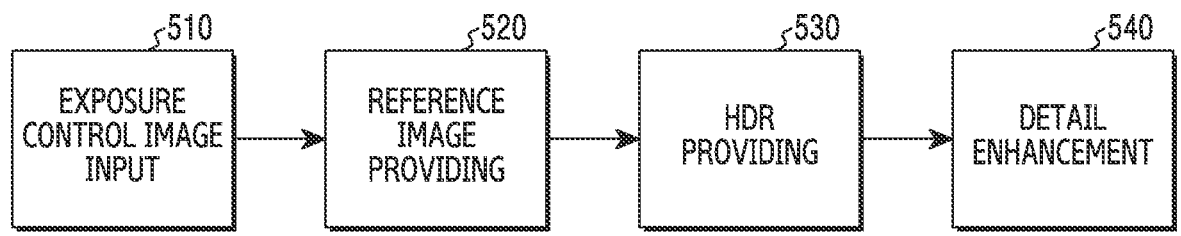
FIG. 5 is a block diagram illustrating an image processing block of an electronic device for providing a high dynamic range (HDR) image in the electronic device according to an embodiment of the disclosure.

FIG. 5 is a block diagram illustrating image processing blocks of an electronic device (e.g., an electronic device of FIG. 1 or an electronic device of FIG. 3 or FIG. 4) providing an HDR image in the electronic device according to an embodiment of the disclosure.

Referring to FIG. 5, according to various embodiments, image processing blocks 510, 520, 530, and 540 may be included in an HDR processing module 321 or 431 of FIG. 3 or FIG. 4.

According to various embodiments, an exposure control image input module 510 may receive a plurality of images having various different brightness from an image sensor (e.g., the image sensor 310 or 410 of FIG. 3 or FIG. 4) or an image signal processor (e.g., the image signal processor 320 or 420 of FIG. 3 or FIG. 4). The inputted image may be, for example, an image before image signal processing (bayer domain) as the original image. The inputted image may be, for example, an image (YUV data) on which image signal processing (ISP demosaic) is performed.

According to various embodiments, a reference image providing module 520 may perform, for example, digital gain and/or noise reduction on image frames inputted from the image sensor or image frames inputted from the image signal processing module, to provide a reference image.

According to various embodiments, the reference image providing module 520 may apply a digital gain to a dark image frame among inputted image frames and perform strong noise reduction, to provide a reference image frame.

According to various embodiments, the reference image providing module 520 may provide an image frame in which a general digital gain is applied to a dark image frame and general weak noise reduction is performed.

According to various embodiments, strong noise reduction of at least a specific strength may be significantly stronger, for example, 4 times or more, than a noise reduction strength for a general image frame.

According to various embodiments, a noise reduction strength for strong noise reduction may be, for example, calculated by multiplying a sensor digital gain value for general noise reduction for a dark image of an image sensor acquiring the dark image additionally by a digital gain value for brightness conversion, for example, and performing a predetermined correction.

According to various embodiments, the noise reduction strength for strong noise reduction may be calculated, for example, by Equation 1 below.

$$\text{Strong NR strength} = \text{dark image NR strength} \times \text{Digital gain} \times \alpha + \beta \qquad \text{Equation 1}$$

Here, the 'Strong NR strength' may be a strength of strong noise reduction, and the 'dark image NR strength' may be a dark image general noise reduction strength, and the 'Digital gain' may be a general digital gain value, and the 'α' may be a difference between a brightness level desired to be obtained as a processing result and a brightness value before processing, and the 'β' may be a dependent variable determined according to a sensor-dependent correction value, for example, a photographing sensitivity (ISO).

Table 1 below is an example of a dark image general noise reduction strength and a strong noise reduction strength dependent on a photographing sensitivity.

TABLE 1

| ISO | dark image NR strength | Strong NR strength |
|---|---|---|
| 100 | 10 | 40 |
| 200 | 20 | 80 |
| 400 | 40 | 160 |
| 800 | 80 | 320 |
| 1600 | 160 | 640 |

Referring to Table 1, the dark image general noise reduction strength is generally in direct proportion of a linear function value to the photographing sensitivity (ISO), and the strong noise reduction strength has been set to, for example, 4 times the general noise reduction strength, but is not limited thereto.

According to various embodiments, an HDR providing module 530 may primarily provide an HDR image by using an image frame in which weak noise reduction has been performed on the reference image frame. The primarily provided HDR image is provided by synthesizing two image frames in which strong noise reduction and weak noise reduction have been performed on the same dark image frame, and thus a ghost-free primary HDR image may be provided.

According to various embodiments, a detail enhancement module 540 may provide a secondary HDR image, by using, for example, appropriate brightness (e.g., 0EV) and/or bright (e.g., +EV, +2EV) image frames among image frames inputted by the exposure control image input module 510 for the primary HDR image. For example, the detail enhancement module 540 may enhance a detail by synthesizing an appropriate brightness image with the primary HDR image, and further enhance a detail of a dark portion (dark part) of the image by using a bright image.

Figure 6:
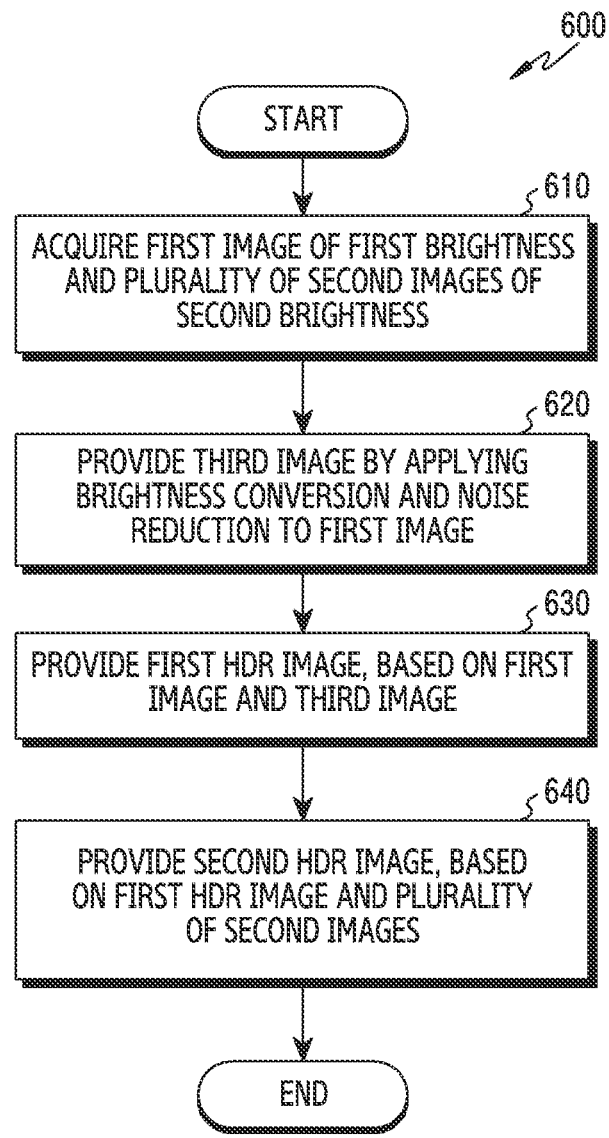
FIG. 6 is a flowchart for explaining an operation of providing an HDR image in an electronic device according to an embodiment of the disclosure.

FIG. 6 is a flowchart for explaining an operation of providing an HDR image in an electronic device according to an embodiment of the disclosure, and FIGS. 7A to 7E are diagrams for explaining an image that is processed according to the execution of the operation of providing the HDR image in the electronic device according to an embodiment of the disclosure.

Referring to FIG. 6 depicting flowchart 600, in operation 610, a processor (e.g., a processor 120, 330 or 430 of FIG. 1, FIG. 3 or FIG. 4) of an electronic device (e.g., an electronic device 101, 300 or 400 of FIG. 1, FIG. 3 or FIG. 4) may control an image sensor (e.g., an image sensor 230, 310 or 410 of FIG. 2, FIG. 3 or FIG. 4) to acquire a first image (e.g., a dark image 703 of FIG. 7A) having a first brightness and a plurality of second images (e.g., bright images 705, 706, and 707 of FIG. 7A) having a second brightness. The first brightness and the second brightness are mutually different brightness.

According to various embodiments, the processor may control the image sensor to acquire a first image having a first brightness and a plurality of second images having a second brightness or third brightness. The first brightness, the second brightness, and the third brightness are mutually different images.

According to various embodiments, the first brightness may be, for example, a dark brightness (e.g., any one of −4EV, −3EV, −2EV, and −EV).

According to various embodiments, the second brightness may be, for example, an appropriate brightness (e.g., 0EV) or a bright brightness (e.g., at least one of +EV, +2EV, +3EV, and +4EV).

According to various embodiments, the second brightness may be, for example, an appropriate brightness (e.g., 0EV), and the third brightness may be a bright brightness (e.g., at least one of +EV, +2EV, +3EV, and +4EV).

Figure 7A:
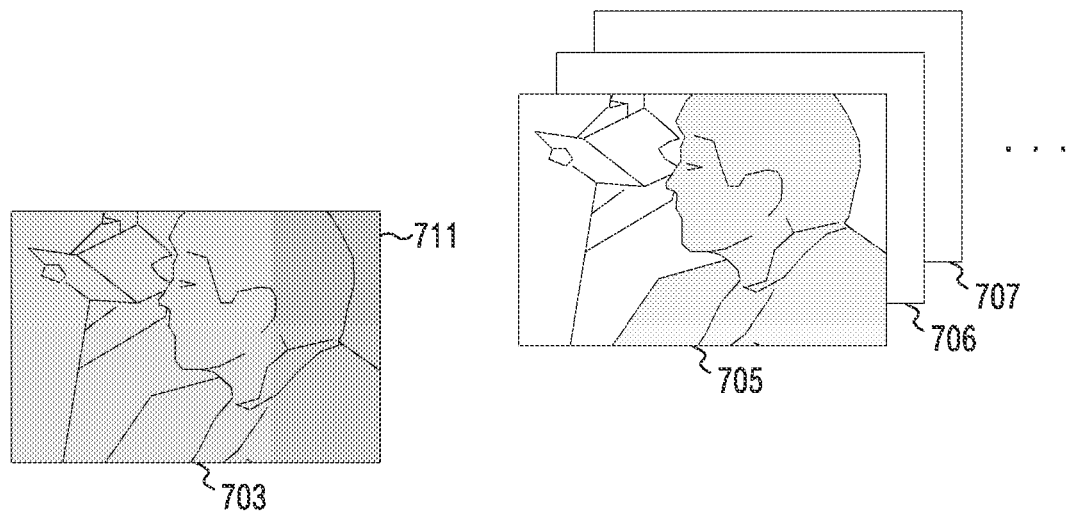
FIGS. 7A, 7B, 7C, 7D, and 7E are diagrams for explaining an image that is processed according to an operation of providing an HDR image in an electronic device according to an embodiment of the disclosure.
Figure 7B:
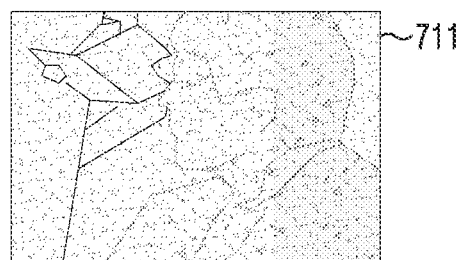
Figure 7D:
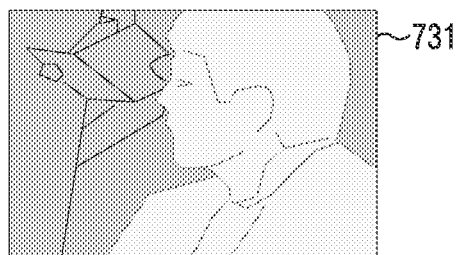
Figure 7C:
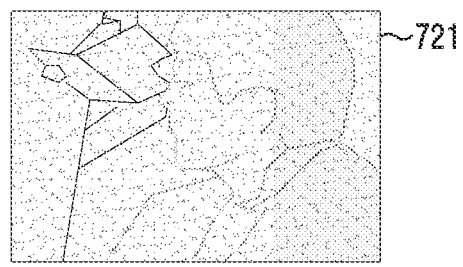
Figure 7E:
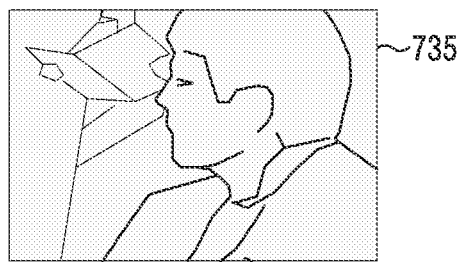

According to various embodiments, in operation 620, the processor may perform brightness conversion and strong noise reduction of at least a first strength on the first image, and provide a third image (e.g., an image 721 of FIG. 7C) having the second brightness. It may be appreciated that an image 711 of FIG. 7B is an image processed to the second brightness by performing the brightness conversion on the first image, and has a noise severely formed.

According to various embodiments, the first strength may be, for example, a value obtained by multiplying a noise reduction strength generally performed for the first dark image 703 by a preset variable, for example, a digital gain value applied to brightness-convert a brightness value of the dark image 703 into a brightness value of the bright image 705.

According to various embodiments, the first strength may be, for example, a value corrected by multiplying and/or adding a specific correction variable by a value obtained by multiplying a noise reduction strength generally performed for the first dark image 703 by a preset variable, for example, a digital gain value applied to bright-convert a brightness value of the dark image 703 into a brightness value of the bright image 705.

According to various embodiments, in operation 630, the processor may provide a first HDR image, based on the first image and the third image.

According to various embodiments, the processor may provide a fourth image by performing brightness conversion and weak noise reduction of a second strength or less on the first image, and provide a first HDR image (e.g., an image 731 of FIG. 7D) by synthesizing the fourth image with the third image.

According to various embodiments, the first HDR image is an image from which a ghost effect is removed, and a detail of a bright part may be somewhat supplemented.

According to various embodiments, the first HDR image is an image from which the ghost effect is removed, and a detail of a dark part may be insufficient.

Meanwhile, the order of the above-described brightness conversion and strong noise reduction processing is not limited as described above, and for example, the strong noise reduction may be first performed on the first image and the brightness conversion may be then performed as well.

According to various embodiments, the second strength may be a noise reduction strength generally performed on the dark image 703 that is the first image.

According to various embodiments, in operation 640, the processor may provide a second HDR image (e.g., second HDR image 735 of FIG. 7E), based on the first HDR image and the plurality of second images having the second brightness. Accordingly, the provided second HDR image 735 may be an HDR image in which a detail is enhanced.

According to various embodiments, the processor may secondarily provide the second HDR image, by additionally using a second image of a third brightness, besides the second image of the second brightness, for the primarily provided first HDR image. Accordingly, the provided second HDR image 735 may be an HDR image in which a detail of a dark portion (dark part) of an image frame is further enhanced.

Figure 8:
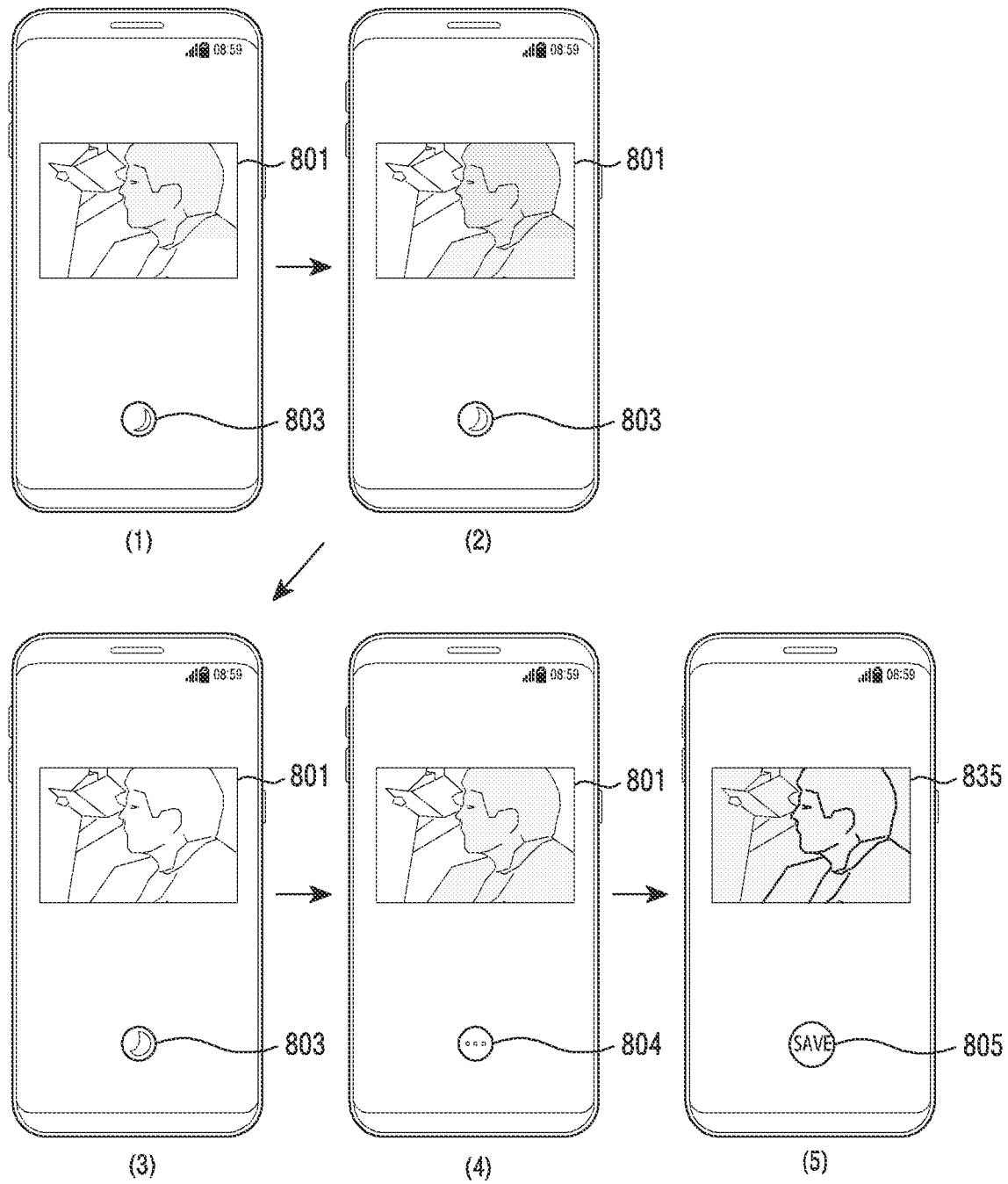
FIG. 8 is a diagram for explaining a user interface according to an operation of providing an HDR image in an electronic device according to an embodiment of the disclosure.

FIG. 8 is a diagram for explaining a user interface dependent on an operation of providing an HDR image in an electronic device according to an embodiment of the disclosure.

Referring to FIG. 8, part (1), the providing of an HDR image is started, for example, by a user's selection, and the electronic device (e.g., an electronic device 101, 300 or 400 of FIG. 1, FIG. 3 or FIG. 4) may display a first icon 803 indicating that an image frame is being acquired from an image sensor (e.g., an image sensor 230, 310 or 410 of FIG. 2, FIG. 3 or FIG. 4) for the purpose of the providing of the HDR image, on a touch screen (e.g., a display device 160 of FIG. 1). The first icon indicating that the image frame is being acquired may include a dynamic image that is varied according to the flow of time wherein it may indicate the flow of time. Parts (1), (2), and (3) of FIG. 8 show a varying image of the first icon according to the flow of time and, for example, may show a form in which the moon gradually fills up from a new moon to a half moon. For example, the displaying of the first icon indicating that the image frame is being acquired from the image sensor may be terminated when the acquiring of the image frame is finished.

According to various embodiments, when the acquiring of an HDR image is started according to a user input for providing the HDR image, the processor may control the exposure of the image sensor, for example, wherein an image frame acquired firstly or initially is acquired as an appropriate brightness image, and present, to the touch screen, a preview image 801 for the initially acquired image of the appropriate brightness. According to various embodiments, in part (4) of FIG. 8, when the acquiring of an image frame from the image sensor is completed, the first icon may be replaced with a second icon 804 indicating that image processing on the acquired image frame is being performed, and the second icon 804 may be displayed. For example, the second icon may include an image exemplifying that a specific operation is being performed according to the flow of time. For example, the second icon may indicate that the image processing is being performed in a form in which three dots are changed into a dynamic image and are each repeatedly displayed and not displayed at different timing.

For example, the displaying of the second icon may be terminated when the image processing is completed.

According to various embodiments, when the image processing is completed and the HDR image is provided, a third icon 805 for selecting whether to store the HDR image on which the image processing is completed may be displayed as in part (5) of FIG. 8.

According to various embodiments, when the image processing is completed and the HDR image is provided, the provided HDR image 835 may be displayed on the touch screen as shown in part (5) of FIG. 8. For example, a user may check the HDR image 835 displayed on the touch screen and touch the third icon 805, to store the provided HDR image 835.

Figure 9A:
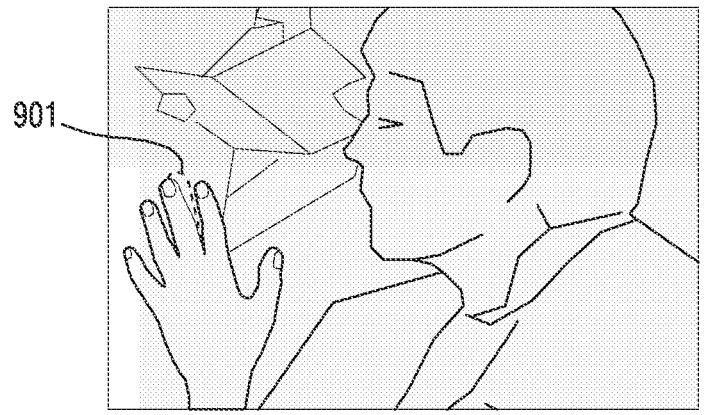
FIGS. 9A and 9B are a diagram for explaining a quality of an HDR image provided by an electronic device according to an embodiment of the disclosure.
Figure 9B:
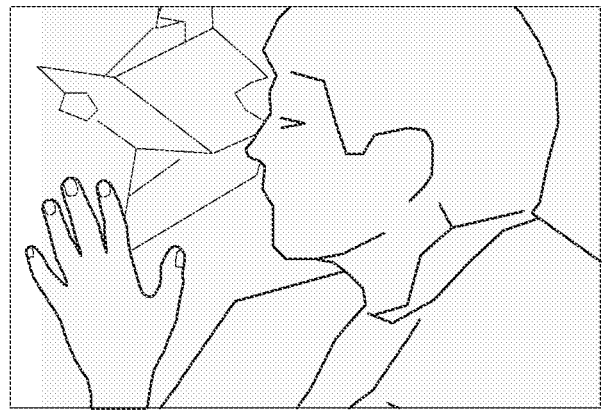

FIGS. 9A and 9B are a diagram for explaining a quality of an HDR image provided in an electronic device according to an embodiment of the disclosure.

According to a conventional HDR providing method, even when an HDR image in which a detail is enhanced is provided when an HDR image is provided by synthesizing a plurality of images, referring to FIG. 9A, when a movement (e.g., a finger movement) of a subject occurs while the plurality of images are acquired, accordingly, an afterimage remains in the HDR image and thus a ghost effect 901 occurs.

According to an HDR providing method of various embodiments, even when the movement (e.g., the finger movement) of the subject occurs while the plurality of images are acquired, referring to FIG. 9B, it may be appreciated that a high-quality HDR image may be provided in which a ghost effect is removed, a noise does not exist, and a detail is enhanced.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
an image sensor; and
a processor,
wherein the processor is configured to:
acquire a first image having a first brightness and a plurality of second images having a second brightness, by adjusting an exposure of the image sensor,
provide a third image having the second brightness, by performing, on the first image, brightness conversion and noise reduction of at least a first strength,
provide a first high dynamic range (HDR) image, based on the first image and the third image, and
provide a second HDR image, based on the first HDR image and the plurality of second images.

2. The electronic device of claim 1,
wherein the first brightness is a brightness lower than a reference brightness, and
wherein the second brightness is a brightness equal to or greater than the reference brightness.

3. The electronic device of claim 1, wherein the processor provides the first HDR image, by performing, on the first image, brightness conversion and noise reduction of at least a second strength and then synthesizing the first image with the third image.

4. The electronic device of claim 3, wherein the first strength is set based on a value obtained by multiplying the second strength by at least a digital gain value for bright converting the first brightness into the second brightness.

5. The electronic device of claim 1, further comprising:
an HDR processing circuit,
wherein the HDR processing circuit performs an operation for providing the first HDR image and the second HDR image under control of the processor.

6. The electronic device of claim 1, wherein the brightness conversion on the first image is performed by applying a digital gain value for converting the first brightness into the second brightness.

7. The electronic device of claim 1, further comprising:
a touch screen,
wherein the processor is further configured to display an icon comprising a dynamic image indicating that image acquisition of the image sensor is being performed, on the touch screen.

8. The electronic device of claim 7, wherein the processor is further configured to, after first acquiring an initial image of the second brightness by adjusting the exposure of the image sensor, acquire the first image and then acquire the plurality of second images.

9. The electronic device of claim 8, wherein the processor is further configured to display a preview image for the initial image of the second brightness on the touch screen while at least the icon is displayed.

10. The electronic device of claim 9, wherein the processor is further configured to, when the second HDR image is provided, display the second HDR image, in place of the preview image, on the touch screen.

11. A method of an electronic device comprising an image sensor and a processor, the method comprising:
acquiring a first image having a first brightness and a plurality of second images having a second brightness by adjusting an exposure of the image sensor;
providing a third image having the second brightness by performing, on the first image, brightness conversion and noise reduction of at least a first strength;
providing a first high dynamic range (HDR) image, based on the first image and the third image; and
providing a second HDR image, based on the first HDR image and the plurality of second images.

12. The method of claim 11,
wherein the first brightness is a brightness lower than a reference brightness, and
wherein the second brightness is a brightness equal to or greater than the reference brightness.

13. The method of claim 11, wherein providing the first HDR image comprises:
providing the first HDR image, by performing, on the first image, brightness conversion and noise reduction of a second strength or less and then synthesizing the first image with the third image.

14. The method of claim 13, wherein the first strength is set based on a value obtained by multiplying the second strength by at least a digital gain value for bright converting the first strength into the second strength.

15. The method of claim 11, wherein the brightness conversion on the first image is performed by applying a digital gain value for converting the first brightness into the second brightness.

* * * * *